Figure 1:
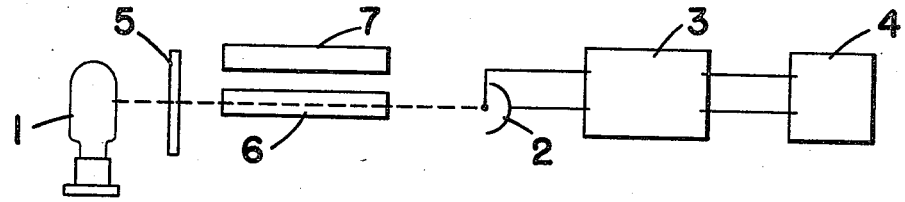

July 8, 1947.                J. J. HEIGL                2,423,774
                           OIL DETERMINATION
                          Filed April 2, 1942

John J. Heigl INVENTOR.
BY T. J. Whelan
ATTORNEY

Patented July 8, 1947

2,423,774

UNITED STATES PATENT OFFICE 2,423,774

OIL DETERMINATION

John J. Heigl, Tulsa, Okla., assignor to Standard Oil Development Company, a corporation of Delaware Application April 2, 1942, Serial No. 437,319

3 Claims. (Cl. 250—83)

The present invention is directed to a method for determining the quantity of petroleum oil in mixtures thereof with foreign material, such as drilling mud, cores, and cuttings obtained during the drilling of an oil well.

It has long been the practice to examine drilling mud, cores of formations traversed by the drilling bit and cuttings of such formations carried to the surface by the drilling mud for the presence of petroleum oil, both for the purpose of determining if a formation penetrated contains oil and whether or not the oil is present in the formation in commercial quantities. The practices followed in the examination of these various substances have been qualitative or semi-quantitative in character. Among them may be mentioned (1) the extraction of the mud or core material with a solvent, such as ether, followed by the evaporation of the ether and measurement by the residue, (2) the distillation of the material suspected of containing oil, followed by recovery of oil from the distillate and (3) the examination of the material suspected of containing oil under ultra-violet light. The latter practice has been applied to cores, cuttings, and drilling muds and has yielded mainly qualitative results.

The principal object of the present invention is the provision of a method for the quantitive determination of oil either in drilling mud, in drill bit cuttings, or cores which will be easily carried out in the field by the utilization of a simple, easily manipulated apparatus. Briefly, the method resides in extracting the material suspected of containing oil with a solvent and comparing the amount of light of a selected wave length transmitted by the extract with the amount of light of the same wave length transmitted by the solvent per se. The solvent selected should be preferably one which does not absorb light of the specific wave length to be employed. Where the solvent absorbs light of the selected wave length too strongly, the method does not have the desired sensitivity for detecting small quantities of oil in the solvent. It will be appreciated that for the intended purpose it is desirable to have a method which will be sensitive to as small a concentration as ten parts of oil per million parts of solvent.

As indicated above, where the solvent selected is one which does not absorb light of the specific wave length employed, it may be sufficient to measure the amount of absorption by the extract alone. Again the recording devices may be so calibrated as to register zero or their maximum reading when the solvent alone is subjected to the selected wave length of light whereby again it will be sufficient to transmit the light only through the extract and use the reading so obtained as the significant figure. Because of variation in the wave length of the output of the light source, however, over which the operator may have no control, as well as variations in the elements of the electrical circuits employed, it is preferred to utilize the blank, the solvent per se, for each measurement so as to make sure that the difference between extract and the blank solvent is determined.

The method of the present invention is particularly adapted for use in the examination of drilling mud components. For this purpose a sample of the drilling mud is taken and extracted with a solvent such as benzol. The extract is then placed between a source of light of selected wave length and a recording device responsive to the light and the amount of light transmitted therethrough is measured. This value is then compared with the value obtained by transmitting light in the same setup through the solvent alone. It will be understood, of course, that by utilization of well known formulae the depth from which any selected sample of mud came can be readily calculated. The procedure is repeated on successive samples of mud at suitable intervals and when a sample is obtained which is shown by this method to contain oil the driller can determine the depth at which he entered the formation containing the oil.

When the method is used for the examination of drilling mud, it is sometimes useful to collect samples of the mud leaving the well continuously, as well as samples of the mud entering the well. Using the same solvent an extract of an outgoing sample is compared to an extract of an ingoing sample. By this procedure, if the mud becomes contaminated with oil, it is still possible to detect any fresh addition of oil to the mud by reason of an oil bearing stratum being penetrated. In the ordinary case, however, it is sufficient to examine only outgoing samples of mud.

It has been found that the wave length of light to be utilized should be in the near ultra-violet range. That is to say, a wave length of 4000 Ångströms will not be absorbed at all by a solution of ten parts of certain petroleum per million parts of benzol, whereas with the same solution, a wave length of about 2000 Ångströms may be completely absorbed. Again, where the concentration of the solution becomes as great as 1000 parts per million parts of solvent, a wave length of about 3500 Ångströms may be completely absorbed while a wave length of 4000 Ångströms would be very satisfactory since it would only be partially absorbed. In practicing the invention, therefore, it is desirable to subject each extract to a series of different wave lengths so as to make sure that the proper wave length for the concentration of oil in the extract is utilized. A very practical wave length is 3650 Ångströms because this wave length constitutes a strong band of the light emitted by a mercury lamp and may be readily isolated from other wave lengths included in this light by the use of well known filters.

When a wave length considerably lower than 3650 Ångströms is employed, it will be desirable to use a solvent other than benzol. Cyclo-hexane is a suitable solvent for use in connection with the lower wave lengths. It is, of course, understood that there are innumerable oil solvents known in the art. It is possible to use any of these well known oil solvents for the practice of the present invention, it being possible by a few simple experiments to determine what is the best wave length of light to use with any selected solvent.

In determining when oil is struck in a wildcat well the method of the present invention is qualitative in nature. For wells drilled in an area where the type of oil to be found is known the method may easily be made quantitative. This is achieved by making standard solutions of the oil in the solvent of varying concentrations, determining the amount of light of a selected wave length absorbed by the various solutions and from this data preparing a graph in which per cent absorbed is plotted against concentration of oil in the solution. This graph will be a hyperbolic curve. To facilitate its use the log of the per cent absorbed is plotted against the concentration of the oil. The resulting graph is a straight line. With this graph the per cent of light absorbed by any unknown extract containing the same oil may be determined and by referring to the graph the concentration of oil in the unknown extract is readily ascertained.

Figure 2:
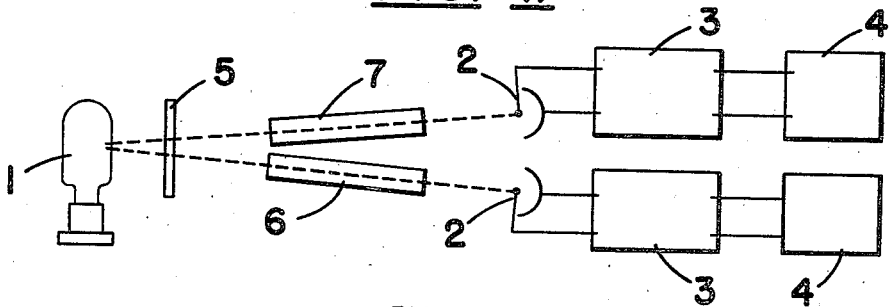
Figure 3:
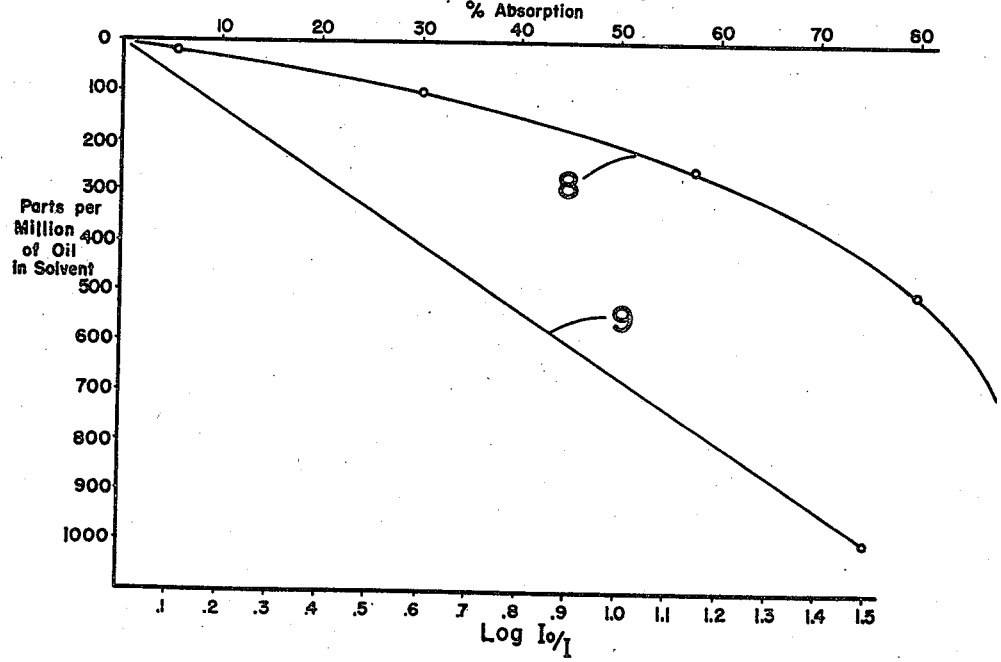

The nature of the present invention will be better understood from the following detailed description of the accompanying drawing in which Fig. 1 is a diagrammatic illustration in plan view of one type of apparatus suitable for the practice of the method. Fig. 2 is a similar view of an alternative type of apparatus and Fig. 3 is a graph showing the concentration of oil in solvent in parts per million plotted against per cent absorption of light having a wave length of 3650 Ångströms in one case and the log of this per cent absorption in the other case.

Referring to Fig. 1, numeral 1 designates a light source which may conveniently be a mercury lamp which is arranged to direct a beam of light into a photocell 2 which is connected to an amplifier 3 the output of which is delivered to a meter 4. Arranged in the path of said beam of light is a filter 5. There are a number of known filters that are capable of isolating certain wave lengths of light and the operator will be supplied with a variety of these filters so that he can examine the sample under various wave lengths.

Between the filter and the photocell is a sample holder 6. This sample holder is preferably a cylindrical glass vessel of a diameter which is small compared to its length. It may be mentioned here that the length of this cylinder should be as large as possible for the reason that the sensitivity of the method is a function in one respect of the length of the cylinder. Numeral 7 designates a cylinder of the same dimensions and the same transmissivity as cylinder 6 for holding the solvent which constitutes the standard. Thus for each sample, the light transmitted through cylinder 6 containing the extract is measured and then the light transmitted through 7 is measured. If desired, the meter can be calibrated so as to register its maximum deflection when cylinder 7 is in the path of the light beam. Then for each sample only the deflection with cylinder 6 in the light beam need be observed.

In the arrangement shown in Fig. 2 two separate photocells 2 are utilized and the cells 6 and 7 are so arranged with respect to the light source and the filter 5 that the light shines simultaneously through both cylinders. The outputs of the photocells are then opposed to each other on the meters 4 and their difference read. It may be desirable in this case to use a logarithmic amplifier and to have two meters 4 calibrated directly in parts per million of oil in the solvent.

In Fig. 3 is shown a curve 8 obtained by plotting parts per million of oil in a solvent, as ordinates, against per cent of light of a wave length of 3650 Ångströms absorbed, as abscissae. It may be pointed out that with concentrations greater than 1000 parts of oil, curve 8 flattens out because there will be 100% absorption. For such higher concentrations a curve similar to 8 may be obtained by using a higher wave length. Likewise, for concentrations of oil less than 10 parts per million a somewhat lower wave length may yield more accurate results. For wildcat purposes, where the method is intended to detect infinitesimal quantities of oil in drilling mud, experience has indicated that a wave length between about 2500 and 3700 Ångströms should be utilized.

It will be observed that the per cent absorption is indicated as $I_0/I \times 100$ where $I_0$ is the amount of light absorbed when cylinder 7 is in the light beam and $I$ is the amount of light absorbed when cylinder 6 is in the light beam. Since the meter readings represent the amount of light transmitted, they may be used to give the relation $I_0/I$ for transmitted light, and the reciprocal of this value times 100 represents per cent absorption. Numeral 9 designates the straight line which is obtained when the log of $I_0/I$ is plotted against parts per million of oil in the extract. It will be noted that this line has a sharp slope whereby it permits the detection of very small variations in oil concentration in the extract. The steepness of this line is one reason why the wave length of 3650 Ångströms is so desirable because with higher wave lengths the slope of the line is reduced while with lower wave lengths 100% absorption occurs with a fairly low concentration of oil.

The present invention also makes possible the differentiation of crude oils on the basis of their gravity. Thus, with a given wave length and a given concentration of oil in a selected solvent the amount of light absorbed will vary with the gravity of the oil. This fact may be utilized to considerable advantage in the determination of the gravity of oils where only minute amounts are available and conventional gravity determination would be difficult or impossible.

The nature and objects of the present invention having been thus described and illustrated, what is claimed as new and useful and is desired to be secured by Letters Patent is:

1. A method for determining the amount of mineral oil of known character in a substance containing it, which comprises preparing a plurality of solutions of varying concentration of said oil in an oil solvent, determining the amount of light of a selected wave length from the near ultra-violet range absorbed by each solution, preparing a graph by plotting oil concentration in solution in the solvent against the log of $I_0/I$, where $I_0$ is a figure representing the amount of light of the selected wave length absorbed by the solvent per se and $I$ is the amount of light of the same wave length absorbed by any given solution, extracting the oil from the substance containing it with the same oil solvent as was used for preparing the graph, determining the amount of light of the selected wave length absorbed by said extract and determining by reference to the graph the concentration of the oil in the extract.

2. A method for determining the presence of mineral oil in a foreign material which comprises extracting said material with a solvent for said oil and comparing the amount of invisible light having a wave length of about 3650 Ångströms absorbed by the extract with the amount of the same light absorbed by the solvent per se.

3. A method for determining the relative amounts of mineral oil in two or more samples of a material containing said oil which comprises extracting the individual samples with a solvent for said oil and ascertaining the relative amounts of invisible light having a wave length of about 3650 Ångströms absorbed by the respective extracts.

JOHN J. HEIGL.

REFERENCES CITED

The following references are of record in the file of this patent:

UNITED STATES PATENTS

| Number | Name | Date |
| --- | --- | --- |
| 2,282,741 | Parker | May 12, 1942 |
| 2,297,939 | Campbell | Oct. 6, 1942 |
| 2,065,953 | Twyman | Dec. 29, 1936 |
| 2,123,573 | McFarlan | July 12, 1938 |
| 2,227,438 | Campbell | Jan. 7, 1941 |
| 2,265,357 | Demarest | Dec. 9, 1941 |
| 2,269,674 | Liddel | Jan. 13, 1942 |